May 1, 1928.
R. H. CARPMAEL
1,667,770
CLOSURE FOR CONTAINERS
Filed Feb. 16, 1927   2 Sheets-Sheet 1
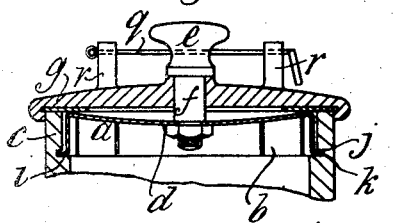
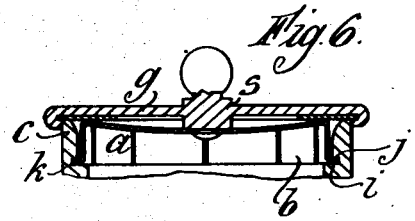
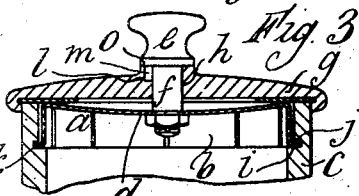
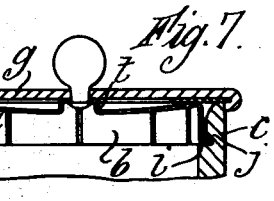
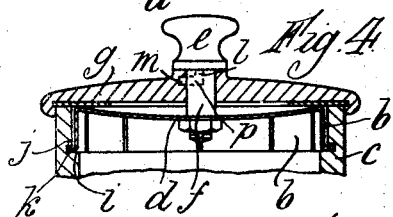
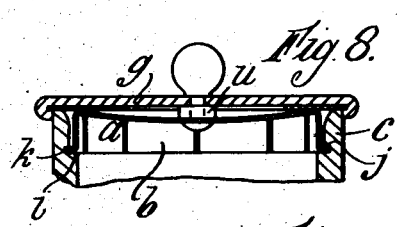
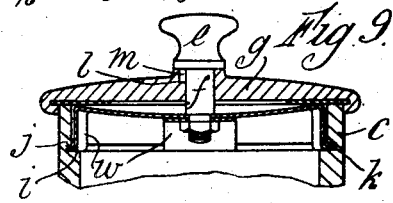
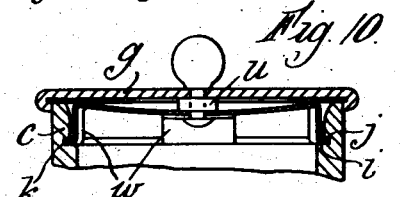
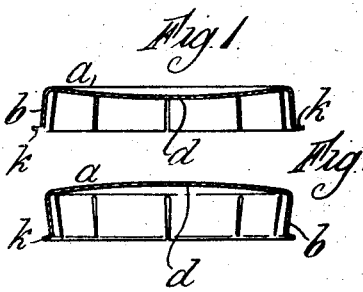
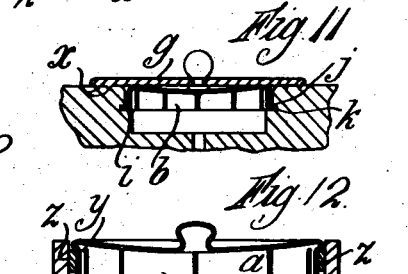
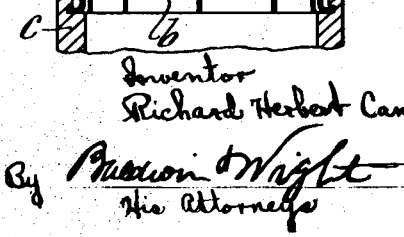
Inventor
Richard Herbert Carpmael
By Marion Wright
His Attorneys May 1, 1928. 1,667,770
R. H. CARPMAEL
CLOSURE FOR CONTAINERS
Filed Feb. 16, 1927   2 Sheets-Sheet 2
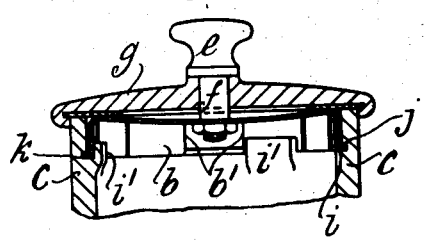
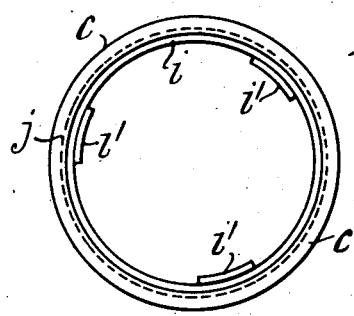
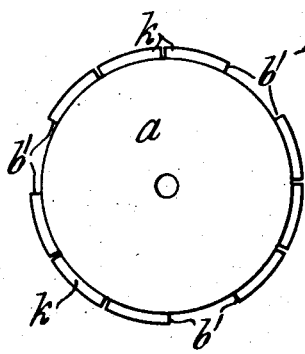
Inventor
Richard Herbert Carpmael
By Baldwin Wright
His Attorneys Patented May 1, 1928.

1,667,770

UNITED STATES PATENT OFFICE.

RICHARD HERBERT CARPMAEL, OF MOULTON, ENGLAND.

CLOSURE FOR CONTAINERS.

Application filed February 16, 1927, Serial No. 168,709, and in Great Britain September 6, 1926.

In a former application Serial No. 140,953 I have described a closure comprising essentially a resilient disk having a central bulged portion capable of being sprung into release and secure positions, the first of which is above and the second below the horizontal.

This invention relates to improvements in the invention described in the above mentioned application and has for its object to effect a more efficient closure, so that a considerable pressure is required to operate the disk.

I find that if I treat the disk in such a manner as to harden or toughen it, it will always return to its initial position.

According to one feature of this invention therefore I employ a resilient disk, such as described above and referred to in my former specification, that has been so treated that it acts as a spring.

It is clear that if I treat the disk when the central bulged portion is in the lower secure position, in order to insert it in the neck of a container, it must be first flexed upwards, and thereby cause the peripheral fingers to retract when it may be easily inserted into the neck of the container, and on releasing the same, the diaphragm will return to its initial position and the fingers engage the neck of the container. This form of disk is hereinafter referred to as a "concave" disk.

Obviously the disk may be treated when the central bulged portion is in the upper or release position, when the reverse operations are required, and in this case it is necessary to lock the disk (hereinafter referred to as a "convex" disk) in the secure position; the disk will then, on release, automatically return to its initial, i. e. release, position.

In my former specification I have described one construction in which an outer cap is provided, and the peripheral fingers of the resilient disk are flanged and engage a groove or shoulder, in the neck of the container, the disk being preferably operated externally by means of a knob on the end of a shaft connected at its lower end to the disk.

In one embodiment of the present invention, a closure comprises an outer cap, a spring disk and an operating knob. Preferably the operating knob is connected to the spring disk by a shaft of a length to allow of sufficient displacement of the disk to open the closure, and a groove may be cut in the hole in the outer cap, through which the shaft carrying the operating knob passes, to accommodate a feather or key provided on the shaft. By means of this arrangement, when a concave disk is employed, and it has been flexed by pulling the knob upwardly, it may be maintained in the release position by giving the knob a slight turn, so that the feather is prevented from entering the groove. When the closure is to be applied, it is only necessary to insert it in the neck of the container and turn the knob, so that the feather re-enters the groove, when the disk is free to spring back to its normal position.

Alternatively, by employing a convex disk, the closure is applied and the knob is pressed downwardly, the disk being locked in this position, or otherwise it will return automatically to the open position.

Locking may be effected in a similar manner to the above, so that when the knob had been depressed, it is only necessary to turn it when the feather will engage the underside of the cap and thus prevent the disk from being released until the knob is again turned and the feather re-enters the groove, allowing the shaft and the disk to return to their initial position.

When employing a concave disk, a safety or locking device for the closed position may be provided, by extending the inner end of the groove at right angles to the original line of cut, and therefore by turning the knob when in the closed position, the feather will enter the extension.

It is obvious that the modifications described in my former specification may also be applied to the present invention.

According to a further feature of this invention, a rubber or other resilient band, forming a washer, may be placed around the peripheral fingers of the disk, and in order to prevent it from becoming disengaged, means such as a groove, or a number of serrations or raised dents, may be made in the sides of the fingers to form a seating for the band, which is preferably located near the base of the fingers so that the band extends above the top of the slots between each finger.

Alternatively the band may be located in the neck of the container, and the holding means also made therein.

According to a further feature of this invention, the outer cap may be directly connected to the disk, so as to be in one piece therewith.

The cap may be connected to the disk by a stem and in one embodiment of the invention the resilient disk or, vice versa, the outer cap, is formed preferably by a stamping or like operation with a central stem or boss to form the stem on which the outer cap, or, vice versa, the resilient disk, is secured while a knob may be secured or formed on to the end of the stem. The stem may be provided with a shoulder which forms an additional support for the cap.

In a further embodiment the outer cap and the disk may be directly secured to one another, with the interposition of a washer, by the shaft of an operating knob passing through holes in the cap and the disk.

According to a further feature of this invention, the resilient disk may be formed as a leaf spring. Two or more such leaf springs may be employed so as to form a cross or star shaped spring.

The invention is illustrated in the accompanying drawings, in which Figures 1 to 13 are sectional views of the various constructions of cap. Fig. 14 is a plan view of a container adapted to receive the cap shown in Fig. 15; Fig. 15 is a plan view of a modified form of cap.

Referring to the drawings, $a$ is a disk formed with peripheral fingers $b$, and $c$ is the mouth of a container. The disk is connected at its central or bulged portion $d$ to an operating knob or handle $e$.

Formed on the operating knob $e$ is a shank $f$, and $g$ is an outer cap having a central hole $h$ through which passes the shank $f$.

The neck of the container is preferably provided with a ledge $i$, and an undercut groove $j$, though in some cases the groove may be omitted. When the groove $j$ is provided, the peripheral fingers have flanges $k$ adapted to enter the groove.

Referring now to Figures 1 and 2, the disks $a$ shown have been tempered so as to act as a spring; Figure 1 shows a "concave" disk and Figure 2 a "convex" disk.

Referring to Figures 3 and 4, a groove $l$ is cut in the hole in the outer cap, and a feather or key $m$ is formed on the shaft of the operating knob. When the knob is pulled and the feather leaves the groove, by slightly turning the knob the feather will engage the surface $o$ of the cap and the closure be maintained in the open position.

In Figure 4 the inner end of the groove $l$ is extended at $p$, whereby, by turning the knob when in the secure position, locking may be effected.

In Figure 5 an additional security device is provided, consisting of a split pin passing through a hole in the operating knob or shaft, and secured in holes in uprights $r$ formed on the outer cap. When the pin is secured in position, the closure cannot be removed without overcoming the tension of the spring.

In the above Figures 3 to 5, the invention is illustrated as applied to a concave disk, but clearly is applicable both to a non-treated resilient disk, such as described in my former application, or the convex disk described hereinbefore, when the reverse locking operations apply.

Referring now to Figures 6, 7 and 8, the disk (which may be either of the resilient, concave or convex type, and is shown as the two former) is directly connected to the outer cap. In Figure 6 a boss $s$ is formed on the cap, and in Figure 7 a boss $t$ on the disk, while in Figure 8 a washer $u$ is employed.

Referring to Figures 9 and 10, the forms shown respectively in Figures 3 and 8 are adapted for use with a four-fingered disk $w$.

Figure 11 shows the application of the invention to forming a closure for an oil cup, the outer cap being provided with sealing ring $x$ to exclude dust.

Figure 12 shows the disk stamped with a groove $y$, positioning a rubber or like band $z$.

In the arrangement set out above, and those described in my former specification, closure is effected by engagement of the underneath of the cap with the top of the container, but it is obvious that the cap may be constructed to fit snugly the interior of the mouth of the neck of the container and in some cases it may be dished with upwardly and/or downwardly extending flanges to fit the neck. The upper walls may be provided with a bridge piece forming a handle.

According to a further feature of the invention means may be provided for securing the closure against removal by preventing the disengagement of the fingers from the groove formed in the neck of the container.

One method of carrying this out consists in forming projections or lips around the neck of the container extending upwards parallel to the sides thereof, corresponding gaps being provided between the peripheral fingers on the disk to allow for the passage of the lips formed on the neck of the container.

In operation after the closure has been applied the disk is given a slight turn by means of the operating knob, on the shank of which it is secured, causing the ends of the fingers to pass behind the lips on the neck.

This is illustrated in Figs. 13, 14 and 15. Fig. 13 is a sectional view showing such a closure in the locked secure position, and Figs. 14 and 15 are plan views respectively of the neck of a container and a disk.

Referring to Figs. 13, 14 and 15, $b^1$ are gaps provided between the peripheral fingers $b$, and $i^1$ are upstanding lips formed on the neck of the container extending above the ledge $i$.

In operation the closure is applied so that the lips $i^1$ pass up between the gaps $b^1$ in the disk, which is given a slight turn as soon as the ends of the peripheral fingers engage the ledge $i$ bringing it to the position shown in Fig. 13.

What I claim is:—

1. In a closure for containers the combination with a spring disk formed with a number of peripheral fingers capable of movement into release and secure positions but which are biased under their own action normally to assume one of said extreme positions, of a container the internal wall of whose mouth is of such a size that the sides of the fingers when in the secure position engage therewith.

2. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith and a ledge and an undercut groove in said wall with which the flanged ends of the fingers engage.

3. The combination with a closure as claimed in claim 1 of an outer cap connected to the disk and adapted when the closure is applied to rest upon the top of the mouth of the container.

4. The combination with a closure as claimed in claim 1 of a shank fast on the disk and an outer cap mounted on said shank on which it has limited movement corresponding to the displacement of the disk.

5. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith, a ledge and an undercut groove in said wall with which the flanged ends of the fingers engage, and an outer cap connected to the disk and adapted when the closure is applied to rest upon the top of the mouth of the container.

6. In a closure for containers the combination with a spring disk formed with a number of peripheral fingers capable of movement into release and secure positions but which are biased under their own action normally to assume one of said extreme positions, of a container the internal wall of whose mouth is of such a size that the sides of the fingers when in the secure position engage therewith, a ledge on said wall upon which the ends of the fingers rest, a shank fast on the disk, and an outer cap on said shank on which it has limited movement corresponding to the displacement of the disk.

7. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith, a ledge and an undercut groove in said wall with which the flanged ends of the fingers engage, a shank fast on the disk and an outer cap on said shank on which it has limited movement corresponding to the displacement of the disk.

8. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith, a ledge and an undercut groove in said wall with which the flanged ends of the fingers engage, a shank fast on the disk, an outer cap on said shank on which it has limited movement corresponding to the displacement of the disk and means for locking the disk in the position opposite to which it is biased to move to prevent displacement of the central portion with respect to the outer cap.

9. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith, a ledge and an undercut groove in said wall with which the flanged ends of the fingers engage, a shank fast on the disk, an outer cap on said shank on which it has a limited movement corresponding to the displacement of the disk and a feather and key-way respectively on said shank and in the hole in the outer cap for the passage of said shank for locking the disk.

10. The combination with a closure as claimed in claim 1 of means connected to the disk for operating the closure.

11. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith, a ledge and an undercut groove in said wall with which the flanged ends of the fingers engage, a shank fast on the disk, an outer cap on said shank on which it has limited movement corresponding to the displacement of the disk and means for securing the closure against removal by preventing disengagement of the fingers from the groove in the neck of the container.

12. In a closure for containers the combination with a spring disk formed with a number of peripheral fingers flanged at their ends and capable of movement into release and secure positions but which are biased under their own action normally to assume one of said extreme positions, of a container the internal wall of whose mouth is of such a size that the sides of the fingers when in the secure position engage therewith, a ledge and an undercut groove in said wall with which the flanged ends of the fingers engage, a shank fast on the disk, an outer cap on said shank on which it has limited movement corresponding to the displacement of the disk and projections on said wall extending upwardly parallel to the side thereof, and corresponding gaps formed between the peripheral fingers to allow for the passage of said projections.

In testimony that I claim the foregoing as my invention I have signed my name this 31st day of January, 1927.

RICHARD HERBERT CARPMAEL